July 7, 1942.  R. L. DOAN  2,288,942
FLUOROSCOPE
Filed June 11, 1940  2 Sheets-Sheet 1

INVENTOR
RICHARD L. DOAN
BY
Hudson, Young, Shanley & Yinger
ATTORNEY

July 7, 1942.　　　R. L. DOAN　　　2,288,942
FLUOROSCOPE
Filed June 11, 1940　　　2 Sheets-Sheet 2

INVENTOR
RICHARD L. DOAN
BY
ATTORNEY

Patented July 7, 1942

2,288,942

UNITED STATES PATENT OFFICE 2,288,942

FLUOROSCOPE

Richard L. Doan, Bartlesville, Okla., assignor to Phillips Petroleum Company, a corporation of Delaware Application June 11, 1940, Serial No. 339,990

2 Claims. (Cl. 250—71)

This invention relates to a method and apparatus for the detection of oil.

Modern drilling practice with rotary equipment and continuous mud circulation has brought about the problem of mud encroachment of porous formations traversed by the bore hole. In many instances the pressure head of mud in the hole is greater than the pressure existing in the porous formation. In such cases, the infiltration of the drilling mud is sufficient to effectively seal off the formation so that very little, if any, of the formation fluid escapes into the bore hole to be carried to the surface by the mud.

The oldest and most reliable method for determining the presence of oil is by direct evidence, such as visual detection. If the formation penetrated by the drill contains fluid under pressure approximately that of the hydrostatic head of the mud, the fluid escapes into the well bore and is carried to the surface by the drilling mud where it may be detected by the drilling crew. However, in cases where the pressure of the drilling mud is sufficient to overcome the formation pressure and cause the drilling mud to penetrate the formation, the quantity of reservoir fluid carried to the surface by the drilling mud is not sufficient to be noticeable to the drilling crew. Some of the formation fluid, i. e. fluid contained in the section cut away by the drill bit, is carried to the surface with the cuttings. It is possible to detect visually the presence of even these small quantities of oil by carefully selecting the conditions under which samples of the drilling mud are observed.

The well known fluorescence of petroleum when exposed to ultraviolet rays offers a means of detecting quantities of oil too small to be found with certainty in ordinary light. The present invention utilizes the fluorescent properties of crude oil as the basis for the determination of its presence in drilling fluid. The fluorescence from small quantities of oil is often so faint as to be clearly visible only in the absence of most of the visible light rays. To observe this fluorescence heretofore it has been necessary to examine samples for the presence of oil in a darkened room similar to the photographic "dark room." To be of use to the drilling crew, it is desirable that the drilling fluid be tested for the presence of oil as soon as possible after emerging from the bore hole. It is readily apparent that it is impractical to maintain a photographic dark room at the drilling rig and that it is inconvenient to take frequent samples of the drilling fluid for examination. To eliminate some of these obstacles, the present invention provides a portable device that may be used at the drilling rig in open daylight for continuously examining the drilling fluid when it emerges from the well bore.

It is an object of this invention to provide an improved method for detecting the presence of oil in drilling fluid.

It is a further object of this invention to provide apparatus for observation of drilling fluid for the determination of oil.

It is a still further object of this invention to provide a portable device which may be used at the drilling rig for the observation of drilling fluid.

The method employed comprises passing a continuous stream of the drilling fluid as it comes from the well through a light excluding compartment in a thin sheet and observing the stream under the action of ultraviolet rays for the presence of oil. The apparatus herein disclosed is simple, rugged in construction and well adapted for use around a drilling rig. The apparatus comprises a light-tight compartment through which a stream of the drilling fluid is continuously pumped. The interior of the compartment is provided with a source of ultraviolet radiations and is so constructed and arranged as to present a large surface of the drilling fluid, per unit volume, to the ultraviolet rays. The fluorescence which results when ultraviolet rays impinge upon any oil on the surface of the drilling fluid may be observed by the operator. It is to be noted that the present invention obviates the collecting of individual samples and that observations may be made whenever desirable simply by energizing the source of ultraviolet radiations.

Figure 1:
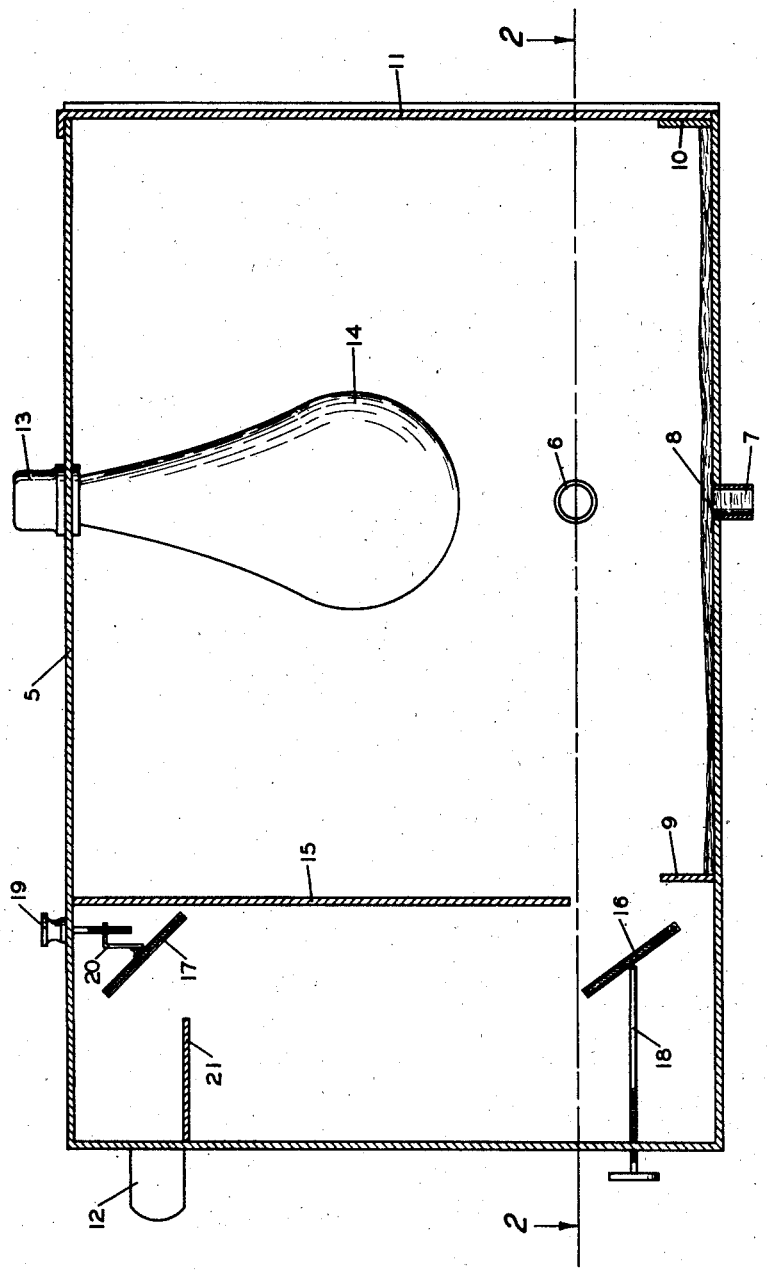
Figure 1 is a vertical sectional view through apparatus suitable for carrying out the present invention.
Figure 2:
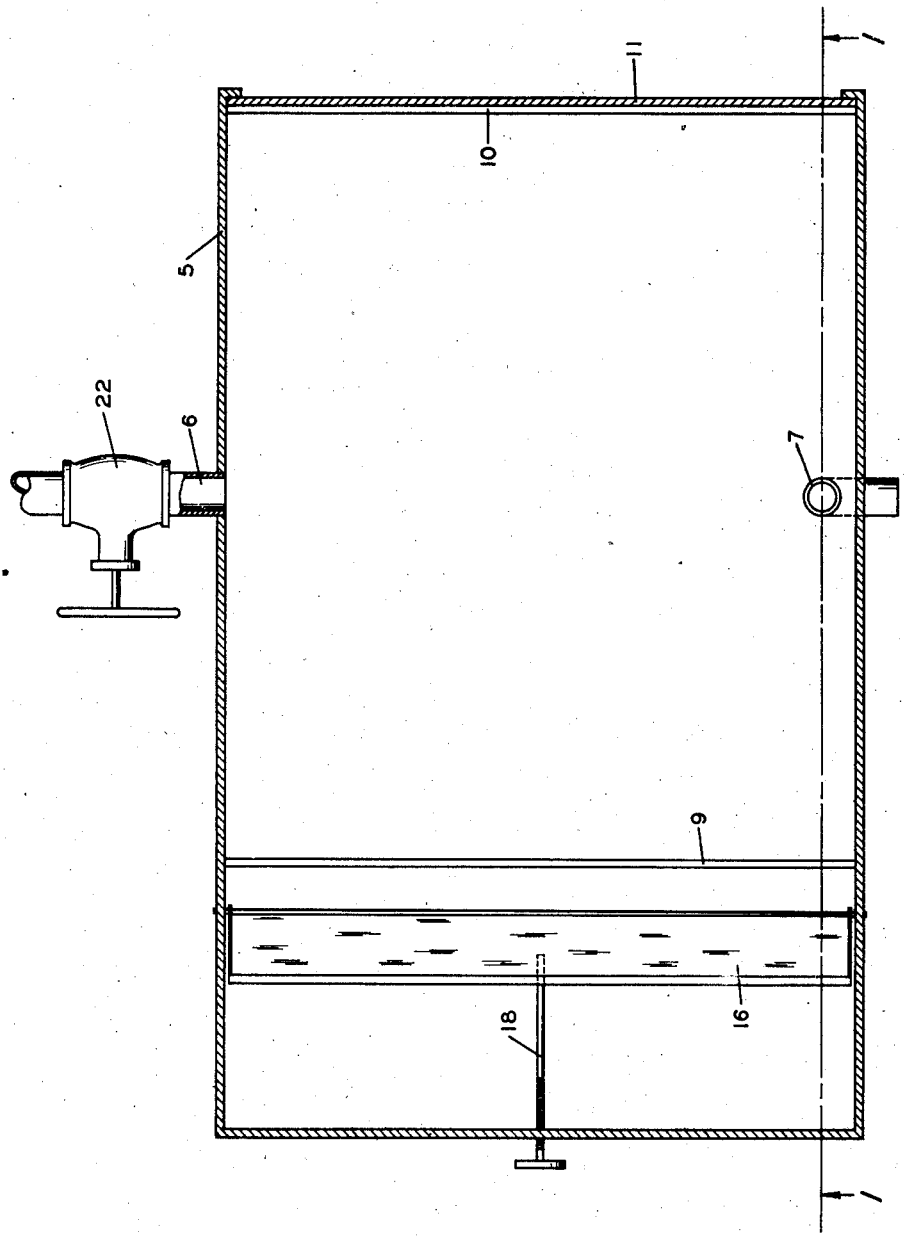
Figure 2 is a horizontal sectional view taken on the plane 2—2 of Figure 1.

The casing or housing forming the light-tight compartment previously referred to is designated generally by the numeral 5. It is here shown in the form of a rectangular box having an inlet 6 and an outlet 7 for passing a continuous stream of drilling fluid through the housing. The fluid flows from the inlet to the outlet in a shallow stream 8 which is confined to a definite area on the bottom of the housing by the dams 9 and 10. A sliding panel 11 in one end of the housing provides access to the interior. A sight opening 12 in the opposite end of the housing allows the operator to view the surface of the drilling fluid stream 8 as will be subsequently described. The sight opening may take the form of a double eyepiece, such as those commonly used on stereoscopes, or any other suitable sighting device which will permit observation but exclude outside light may be employed.

Secured to and extending through the top of the housing is a socket 13 of the type normally used for receiving the base of an incandescent lamp. The lamp 14 on the interior of the housing serves as the source of ultraviolet radiations when energized with electric current from a suitable source. The lamp is a commercial design in which a special glass is used. The glass filters out most of the visible rays but allows the ultraviolet rays to pass through. The reduction of visible light to a negligible quantity is essential for the observation of the weak fluorescence from minute quantities of oil. For this reason the apparatus is so constructed that there will be a minimum leakage of light into the housing. Further, the observer's eyes must be shielded against direct radiation from the lamp since the small residual of visible light may be of greater intensity than some of the fluorescence it is desired to observe.

A system of shields and mirrors serves to allow visual observation of the drilling fluid and at the same time protect the observer from any extraneous visible light which might tend to interfere with the observation of fluorescence. A vertical barrier 15 which extends from the top of the housing to a point below the lowest part of the lamp 14 serves to shield the eyes of the user from direct radiation from the lamp. Pivotally mounted on the interior of the housing near the bottom thereof is a mirror 16 so mounted as to be in alignment with the opening between the vertical barrier 15 and the dam 9. Directly above mirror 16 and in alignment with the sight opening 12 is a similarly mounted mirror 17. A screw 18 in threaded engagement with and extending through the end of the housing is provided for adjusting the angle of the mirror. A screw 19, extending through the top of the housing, is in threaded engagement with an angle 20 attached to the back of the mirror 17 and serves to adjust the angle of the mirror. Below the sight opening 12, a light baffle 21 is positioned so that only light reflected from the mirror 17 will be visible to the operator. It will be readily apparent that by adjusting the angles of the mirrors by means of the screws 18 and 19, the operator can view the surface of the stream of drilling fluid 8 for fluorescence.

In operation of the present device, drilling fluid from the discharge line on the drilling rig is pumped continuously through the control valve 22 and the inlet 6 into the interior of the housing. The fluid spreads out to form a shallow stream directly under the ultraviolet lamp 14 and is drained out of the housing by gravity through the outlet 7 in the bottom of the housing. The lamp 14, energized with electric current from a suitable source of supply, subjects the surface of the drilling fluid to ultraviolet radiations. Any oil present in the drilling fluid tends to rise to the surface where it is directly exposed to the ultraviolet radiations. The presence of the oil is shown by the changing of the invisible ultraviolet rays to visible rays which may be observed by the operator as a fluorescence of the oil. The presence of oil in drilling fluid may thus be readily detected without the use of chemicals or the necessity of carrying samples to a laboratory for examination.

I claim:

1. A portable apparatus for examining drilling fluid to detect the presence of crude oil therein comprising a compartment made light tight, a channel in the bottom of the compartment for passing drilling fluid in a shallow stream through the compartment, an inlet in the compartment to deliver drilling fluid to the channel, an outlet from said compartment to receive a flow of drilling fluid from the channel, a source of ultraviolet radiation in the compartment directly above the channel, a mirror mounted in the lower portion of the compartment, a mirror in the upper portion of the compartment and opposite a sight opening, the mirror in the lower portion of the compartment reflecting the fluorescence of any oil present in the drilling fluid to the upper mirror which is observed through the sight opening and a light barrier between the source of ultraviolet radiation and the mirror in the upper portion of the compartment.

2. A portable apparatus for examining drilling fluid to detect the presence of crude oil therein which comprises a compartment made light tight, a source of ultraviolet radiations in the compartment, an inlet for drilling fluid in the compartment, an outlet for drilling fluid in the bottom of the compartment, a sight opening in the compartment for observation of the drilling fluid for fluorescence indicative of the presence of oil, a system of mirrors for reflecting to the sight opening any visible fluorescence from the drilling fluid under observation, and a shield between the sight opening and the source of ultraviolet radiations.

RICHARD L. DOAN.